(12) United States Patent
Malpani et al.

(10) Patent No.: US 10,503,891 B2
(45) Date of Patent: Dec. 10, 2019

(54) METHOD AND SYSTEM FOR AUTOMATICALLY SELECTING AN AUTHENTICATION DOMAIN

(71) Applicants: Canon Information and Imaging Solutions, Inc., Melville, NY (US); Canon U.S.A., Inc., Melville, NY (US)

(72) Inventors: Aarti Malpani, Edgewater, NJ (US); Lance Yiuchong Leung, Forest Hills, NY (US); Jiuyuan Ge, Centereach, NY (US)

(73) Assignees: CANON INFORMATION AND IMAGING SOLUTIONS, INC., Melville, NY (US); CANON U.S.A., INC., Melville, NY (US)

( * ) Notice: Subject to any disclaimer, the term of this patent is extended or adjusted under 35 U.S.C. 154(b) by 336 days.

(21) Appl. No.: 15/647,783

(22) Filed: Jul. 12, 2017

(65) Prior Publication Data
US 2018/0018453 A1 Jan. 18, 2018

Related U.S. Application Data

(60) Provisional application No. 62/362,505, filed on Jul. 14, 2016.

(51) Int. Cl.
*G06F 21/30* (2013.01)
*H04L 29/06* (2006.01)
(Continued)

(52) U.S. Cl.
CPC ............. *G06F 21/36* (2013.01); *G06F 21/34* (2013.01); *H04L 9/3226* (2013.01);
(Continued)

(58) Field of Classification Search
CPC ................................ H04L 63/08; G06F 21/30
(Continued)

(56) References Cited

U.S. PATENT DOCUMENTS

| | | | |
|---|---|---|---|
| 7,047,560 B2 * | 5/2006 | Fishman | G06F 21/31 380/270 |
| 7,958,258 B2 | 6/2011 | Yeung et al. | |

(Continued)

*Primary Examiner* — Izunna Okeke
(74) *Attorney, Agent, or Firm* — Canon U.S.A., Inc., IP Division

(57) ABSTRACT

An image processing apparatus and method is provided. The image processing apparatus has one or more processors and a memory that stores instructions for execution by the one or more processors. Upon execution of the instructions, the image processing apparatus is configured receive, from a credential source, a credential having a domain identifier identifying an authentication domain and authentication data used to authenticate with authentication domain and parse at least a portion of the domain identifier to obtain information identifying the authentication domain with which to authenticate the credential. The image processing apparatus is automatically reconfigured to authenticate with the identified authentication domain when it is determined, based on the information identifying the authentication domain, that a currently configured authentication domain is different from the identified authentication domain and the authentication data of the received credential is transmitted to the reconfigured domain for domain authentication processing.

20 Claims, 10 Drawing Sheets

(51) Int. Cl.
*G06F 21/36* (2013.01)
*H04L 9/32* (2006.01)
*G06F 21/34* (2013.01)
*G06F 21/31* (2013.01)
*G06F 16/58* (2019.01)

(52) U.S. Cl.
CPC ............ *H04L 9/3234* (2013.01); *G06F 16/58* (2019.01); *G06F 21/31* (2013.01)

(58) Field of Classification Search
USPC .......................... 713/155, 168, 170; 726/2, 3
See application file for complete search history.

(56) References Cited

U.S. PATENT DOCUMENTS

| | | |
|---|---|---|
| 8,533,786 B2 | 9/2013 | Chabbewal et al. |
| 8,544,069 B1 | 9/2013 | Subbiah et al. |
| 8,677,451 B1 | 3/2014 | Bhimaraju et al. |
| 9,231,940 B2 | 1/2016 | Counterman |
| 9,276,929 B2 | 3/2016 | Williams et al. |
| 9,444,808 B1 | 9/2016 | Sherman et al. |
| 2011/0173688 A1* | 7/2011 | Nanaumi ................ G06F 21/31 726/8 |

* cited by examiner

METHOD AND SYSTEM FOR AUTOMATICALLY SELECTING AN AUTHENTICATION DOMAIN

CROSS-REFERENCE TO RELATED APPLICATIONS

This nonprovisional application claims the benefit of U.S. Provisional Patent Application Ser. No. 62/362,505 filed on Jul. 14, 2016, the entirety of which is incorporated by reference herein.

BACKGROUND OF THE INVENTION

Field of the Invention

The present invention relates generally to authentication, and more particularly to a method and system for selecting an authentication domain.

Description of the Related Art

Modern computing systems often employ security measures to prevent breaches of the computing system. For example, computing systems may require users to be authenticated before granting them access to one or more resources of the computing system. Authentication may include the computing system prompting the user to provide a credential in order to log in to the computing system. The authentication may be based on a username and password, a smart card and personal identification number (PIN), or other information associated with the user. Once logged in to the computing system, the user has access to one or more resources of the computing system. It is also known that computing systems may be configured to connect to more than one domain, each of which having its own authentication mechanism. A problem arises when a user seeks to access a computing system with a credential that needs to be authenticated with a particular domain. Despite the computing system being able to access more than one domain, the computing system may be configured to connect to one of the possible domains. When a user provides a credential that needs to be authenticated on a domain other than one for which it is currently configured, the user will be unable to access the resources of the computing system despite being authorized to do so. Further problems exist in that, because the user knows he is able to access the domain, repeated authentication attempts may occur resulting in disabling of the computing system and/or disabling an account of a user providing the credential. Additionally, requiring a user to select or otherwise configure an authentication domain has certain security risks associated therewith.

A system and method according to invention principles remedies the deficiencies associated therewith.

SUMMARY OF THE INVENTION

Embodiments address the various problems described above. Methods, apparatuses, and computer-readable storage media for selecting an authentication domain are disclosed.

According to an embodiment, an image processing apparatus and method is provided. The image processing apparatus has one or more processors and a memory that stores instructions for execution by the one or more processors. Upon execution of the instructions, the image processing apparatus is configured to receive, from a credential source, a credential having a domain identifier identifying an authentication domain and authentication data used to authenticate with the authentication domain and parse at least a portion of the domain identifier to obtain information identifying the authentication domain with which to authenticate the credential. The image processing apparatus is automatically reconfigured to authenticate with the identified authentication domain when it is determined, based on the information identifying the authentication domain, that a currently configured authentication domain is different from the identified authentication domain and the authentication data of the received credential is transmitted to the reconfigured domain for domain authentication processing.

In a further embodiment, an image processing apparatus is provided. The image processing apparatus includes one or more processors and a memory storing instructions that, when executed by the processor causes the image processing apparatus to operate in the following manner. A credential having domain identifier is received from a credential source. The domain identifier is parsed to obtain information identifying a domain with which to authenticate the credential. A source of available domain configurations stored in memory is searched to determine whether the image processing apparatus is capable of authenticating the credential with the identified domain. In response to determining that the image processing apparatus is capable of authenticating with the identified domain and that a current configuration of the image processing apparatus includes a domain other than the identified domain, automatically re-configuring the image processing apparatus to authenticate with the identified domain and transmitting the credential to the reconfigured domain for authentication processing.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments are described with reference to the drawings.

Figure 1A:
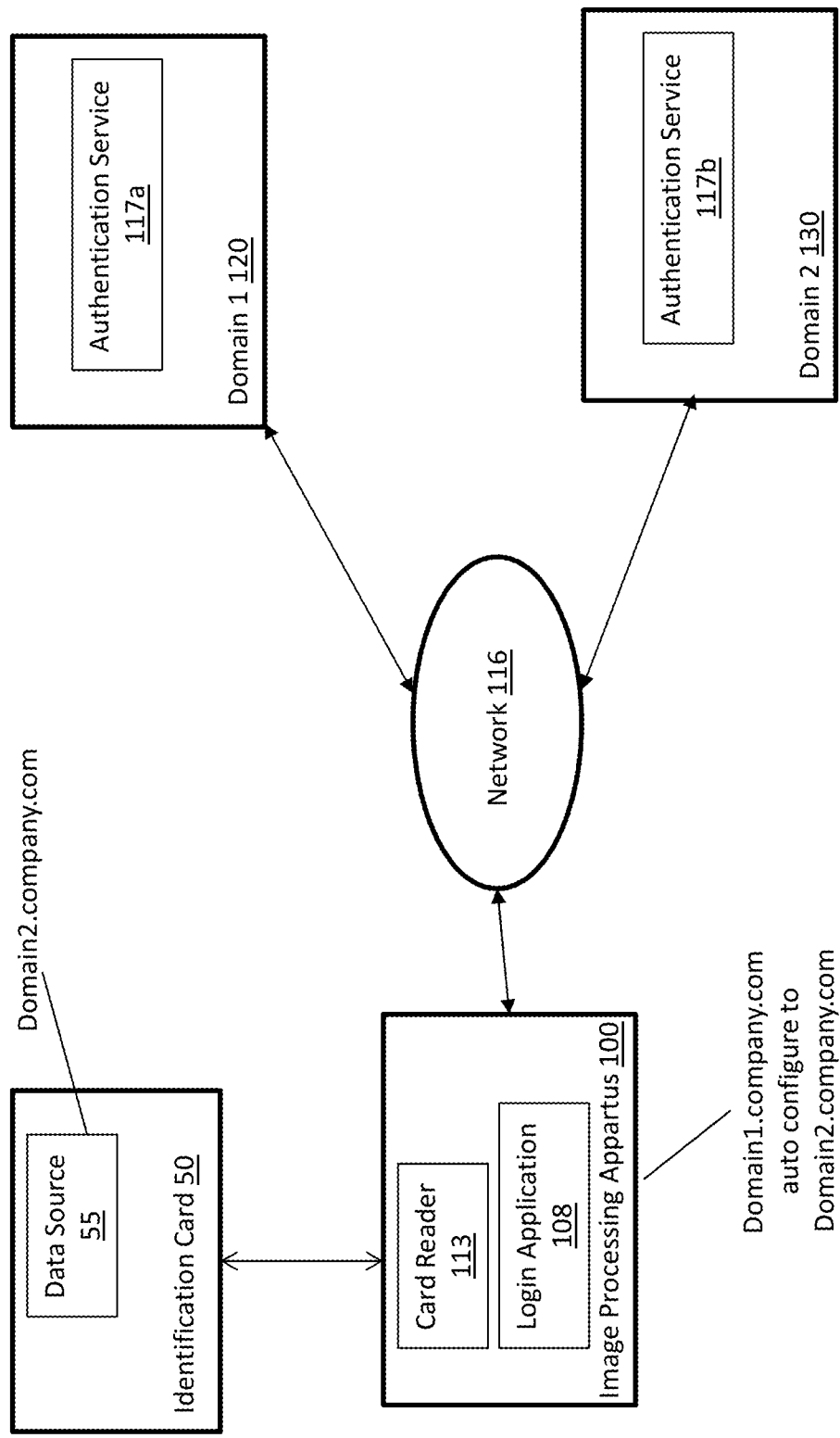
FIG. 1A illustrates an exemplary operating environment according to invention principles.

FIG. 1A illustrates a networked environment including an image processing apparatus 100 that is able to selectively connect to one or more authentication domains, represented generally by reference numeral 117 via a communications network 116. The image processing apparatus 100 includes an input/output device (I/O) 113 that selectively enables the image processing apparatus 100 to obtain information from an external source. In one embodiment, the I/O device 113 is a card reader (e.g. smart card reader—either contact or contactless smart card reader) that can selectively receive an identification card 50 therein and read and write information to the identification card 50. In the embodiment shown herein, the identification card 50 is a smart card (either contact or contactless) having independent circuitry to perform one or more predetermined tasks. The identification card 50 may also include a data source 55 including one or more data objects. The one or more data objects includes certificate data. Certificate data includes identification information and authentication information that is used to identify a user associated with the card and authentication data to authenticate the user with an authentication service that may be executing one of on the image processing apparatus 100 or executing on an a particular domain remotely located from the image processing apparatus 100. Also stored in data store 55 of smart card 55 is verification information that is used to verify an identify of a user who has inserted the identification card into the card reader 113 (or otherwise caused the card to be read by the reader). In one embodiment, the verification information is a personal identification number (PIN) that the identification card can verify when a user enters the PIN at the image processing apparatus prior to the certificate being provided from smart card to the image processing apparatus 100 via the card reader 50.

The following will now generally discuss the operation whereby a user in possession of smart card 50 would like to be authenticated with the image processing apparatus 100 in order to use one or more service or functions provided by the image processing apparatus 100. In exemplary operation, the image processing apparatus 100 includes a login application 108 that facilitates login and authentication processing. In this embodiment, the image processing apparatus 100 may be selectively configured to communicate with an authentication service 117 to authenticate a user based on the credential information obtained from the identification card 50. Herein, the image processing apparatus 100 may be configured to log into either a first domain 120 having a first authentication service 117a or a second domain 130 having a second authentication service 117b. Each of the first domain 120 and second domain 130 is identifiable on a network by a unique network address. In practice, the image processing apparatus 100 is configured to access each of the first domain 120 or the second domain 130 in order to authenticate a user. However, in operation, the actual domain with which the image processing apparatus 100 is configured to authenticate may not necessarily match the domain that is configured on the smart card attempting to be authenticated. The result of this misconfiguration would be an error message and the user would be prevented from authenticating themselves and be unable to use the function or service of the image processing apparatus 100. Further, when domains do not match, it requires removal of the smart card from the reader and manual reconfiguration of a proper domain on the image processing apparatus 100. This too is problematic because image processing apparatus 100 may be configured with a plurality of authentication domains for different users, each domain having different security permissions. In this instance, users may not remember which domain their smart card is set to authenticate with and result in a long process of trial and error leading to device downtime and potential security risks.

The login application 108 eliminates the need for removal of the smart card from the reader and subsequent manual domain configuration. The login application 108 advantageously receives the credential information and derives therefrom domain identification information which can then be compared to domain identification stored in a data store of the image processing apparatus 100. The comparison first determines if the domain associated with the domain identification information is configured for use with the image processing apparatus 100 and, if so, whether or not a currently configured domain is the domain identified in the domain identification information. Depending on the result of the query, the login application 108 can one of (1) transmit the credential information to the domain for authentication with the authentication service when the domain identification information matches the currently configured domain and (2) automatically modify the currently configured domain to be the domain identified in the domain identification information and then transmit the credential information to the domain for authentication with the authentication service of that domain. The automatic reconfiguration is performed without removing the smart card from the card reader.

In one embodiment, the login application 108 parses the credential information for user principal name (UPN) data indicative of a domain with which the credential should be authenticated. For example, the UPN data may be "domain1.company.com" which identifies that the credential should be authenticated with "domain1". In operation, the login application 108 would parse the domain identifier to extract the UPN data and compare the extracted UPN data with a set of configured domain names in an application data store. If the domain indicated by the UPN data is not currently configured as the active domain, the login application 108 automatically modifies the configured domain to match the domain identified in the UPN data and initiates an authentication processing to authenticate the credential with the newly configured domain which matches the domain of the UPN data.

In another embodiment, the UPN data may include an alias domain name that does not directly correspond to the name of the domain with which the credential should be authenticated. In this embodiment, the data store of the login application 108 may include alias domain information that identifies alias domains that are associated with and actually represent a target domain for authentication. In this embodiment, in addition to the query of the domain association data structure to see if there is a one to one match of domain information contained in the domain identifier, the login application 108 also searches the data structure see if the domain identified in the UPN data is an alias domain. It parses the section of the data structure including alias domain information and, upon detecting a match, selects the actual domain with which the alias domain information extracted from the UPN data is linked. If this domain is not currently configured as active, the login application 108 automatically modifies the domain configuration to be configured to connect with and use the authentication service of the domain that is linked to the alias domain indicated in the UPN data obtained from the credential.

In certain embodiments, the certificate on a particular smart card is not configured to include UPN data. The login application 108 may still automatically identify and configure itself to connect with the correct authentication domain. The login application 108 may further parse the credential data for secondary domain identification information other than UPN data and extract the secondary domain identification data to determine the correct authentication domain to be automatically configured by the login application 108. In one embodiment, the secondary domain identification information may be domain component information. The login application 108 may extract one or more data from the credential identifying one or more domain components to determine the correct authentication domain to be automatically configured. In one embodiment, the login application 108 may use a single element of domain component information to identify the correct login domain. For example, a domain may have the domain address "domain1.company.com". In this example, this domain has three domain components (1)"domain1"; (2)"company"; and (3)"com". The login application 108 may extract a first domain component "domain1" from the set of domain components and search the domain data structure of the login application 108 to determine if "domain1" is contained in any domains stored in the data structure. Upon detecting a match, the login application 108 may select the matching domain to automatically configure itself to authenticate with the desired domain. In other embodiments, certain authentication domains might have one or more domain components in common as well as having a large number of domain components. If the application detects that more than one configured domain includes the extracted first domain component, the login application 108 extracts further domain components and performs a similar search and configuration. In a further embodiment, the login application 108 extracts all domain components and generates a domain name therefrom and uses the generated name to search the domain data structure to locate and select the correct authentication domain for automatic configuration.

In another embodiment, the login application 108 may use one or more elements of information included in the subject name data of the certificate. The elements of the subject name data may be used individually and/or in combination with one another to selectively identify the domain with which the certificate should be authenticated. This may include, but is not limited to (a) organizational unit (OU) information; (b) common name (CN) information; (C) domain component (DC) information; (d) organization information (O); and/or (e) country (C) information.

As discussed above, the login application 108 includes a domain data structure that identifies a set of domains that can be logged into using the login application 108. An exemplary data structure is shown in Table 1 below and indicates that the two domains able to be selected for authentication are "domain 1" and "domain 2".

TABLE 1

| Domain Data Structure |
| --- |
| Configurable Authentication Domains |
| Domain1.company.com |
| Domain2.company.com |

By using the data structure of Table 1, the login application 108 may extract the domain identification information from the credential and query the domain data structure to determine a match to be selected for automatic configuration for an authentication processing.

In another embodiment, where the domain data structure includes a set of alias domain names that are mapped to and linked to particular domains, the domain data structure may be a data structure shown in Table 2.

TABLE 2

| Domain Data Structure | |
| --- | --- |
| Configurable Authentication Domain | Alias Domains |
| Domain1.company.com | Alias.test.com; alias1.test.com |
| Domain2.company.com | |

In this embodiment, the login application 108, in response to extracting domain identification information from the credential, can query all columns and rows of the data structure in Table 2 to determine a match to be selected for automatic configuration for an authentication processing. In the event that the extracted domain identification information matches an alias domain value, the login application 108 automatically maps that value to its associated configurable authentication domain and selects the mapped domain for login and authentication processing.

While two different domain data structures are detailed herein, it should be understood that the domain data structure may include any number of columns including types of information able to be extracted from a credential certificate and which can be searched and mapped to a particular domain with which connection and authentication can occur.

Additionally, while the above operation is discussed with respect to login application 108, it should be understood that the functionality and operations provided by login application and discussed throughout this description can be incorporated into a task specific application which, in response to selection by a user of the image processing apparatus, results in the image processing apparatus 100 performing a particular function. In one exemplary embodiment, the task specific application includes scan-to-email functionality, scan-to-fax functionality, scan-to-folder functionality, scan-to-FTP functionality, and/or scan-to-cloud functionality that require user authentication prior to a user being able to execute the send processing of these features. In this example the features, routines and algorithms of the login application 108 may be included in the task specific application to automatically configure the domain that is used to authenticate the user's credential prior to performing the send operations associated with any of the application tasks.

Figure 1B:
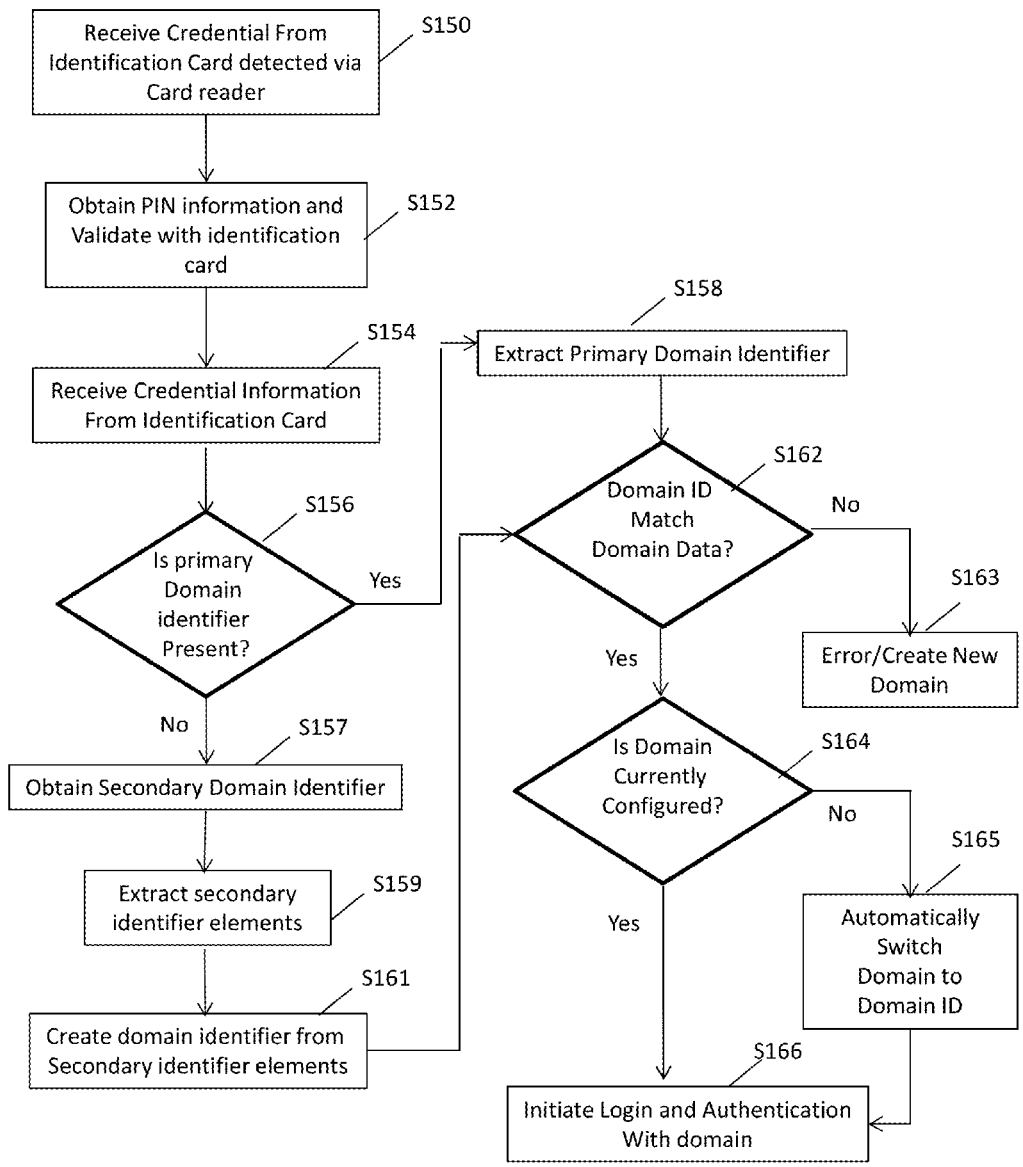
FIG. 1B is illustrates a flow of operations according to invention principles.

FIG. 1B illustrates an algorithm for performing the functionality of the login application 108. It should also be understood that this algorithm may be incorporated as a subroutine or made otherwise part of a task specific application that requires its own login and authentication processing to enable a user to access and make use of the resources and functionality of the task specific application. Further, any components for performing the described operations will be referred to using the reference numeral in either FIG. 1A and/or FIG. 2 discussed below.

In step S150, the application 108 receives a credential from the data source 55 of the identification card 50. This is performed by card reader 113 which reads the data from the identification card 50 inserted therein. In one embodiment, the identification card 50 is a smart card and the card reader 113 is a smart card reader. Before being provided access to the credential received in step S150, the application, in step S152, obtains PIN information from the user and validates the PIN by transmitting the obtained information to the smart card which performs PIN verification processing thereon. In one embodiment, the PIN information is entered via an operation panel (e.g. via touch screen input) on the image processing apparatus 100. In another embodiment, the PIN information is obtained by a biometric scan of the user. In a further embodiment, the PIN is obtained from an external portable communication device such as a smartphone or mobile phone which transmits data representing the PIN information to the image processing apparatus. Once authenticated, the application receives and has access to the credential information received from the identification card in step S154. The application 108, in step S156, parses the credential information to determine if a primary domain identifier is included therein. In one embodiment, the application parses the credential information for a UPN data that identifies the domain that should be used to authenticate the user. If the primary domain identifier is present, the application extracts the primary identifier from the credential in step S158 and determines, in step S162, if the primary domain identifier (Domain ID) matches domain data stored in a domain data structure. In one embodiment, the application searches the domain data structure to identify if any stored authentication domains match the domain identified by the primary domain identifier extracted from the credential information. If the result of the determination is that there is no matching domain in the domain data structure, the algorithm proceeds to step S163 and one of (a) generates an error message and provides an error message to the user via an operation panel of the image processing apparatus or (b) initiates a domain addition procedure whereby the domain included in the primary identifier is added as a record to the domain data structure to enable connection therewith. In a further embodiment, if the result of the determination in step S162 is negative, the application searches the domain data structure to determine whether the domain in the primary identifier is an alias domain that is mapped to an actual domain stored in the data structure. If it is determined that the domain is an alias and is mapped, the application uses the mapped domain to continue processing in step S164 as discussed below.

In response to the determination in step S162 being positive (YES in S162), the application determines whether that determined domain is a currently configured login domain in step S164. If the result of that determination is positive (YES in S164) the application initiates login and authentication processing with the domain in step S166 by transmitting the credential to the domain for authentication processing. If the determination in step S164 is negative (NO in S164), the application automatically switches the currently configured domain to a domain corresponding to the domain included in the domain identifier in step S165 and then proceeds to step S166 to initiate login and authentication processing with the newly reconfigured domain by transmitting the credential to the reconfigured domain for authentication processing.

Returning back to step S156, if it is determined that the primary domain identifier is not present (NO in S156), the application obtains secondary domain identifier information from the credential information in step S157. The secondary credential information may include but is not limited to (a) organizational unit (OU) information; (b) common name (CN) information; (C) domain component (DC) information; (d) organization information (O); and/or (e) country (C) information. In step S159, the application extracts predetermined secondary identifier elements from the secondary domain identifier information and create a domain identifier (Domain ID) using the extracted elements in step 161. Once the domain ID is created in step S161, processing continues at steps S162-S166 as discussed above with the exception that the Domain ID being compared herein was extracted or created using secondary domain identification information as opposed to the primary domain identification information of step S158.

In another embodiment, the application may skip steps S161 and use one or more extracted elements of secondary domain identification information to search the domain data structure in S162 to determine if any individual element or combination of elements is present in domain information stored in the domain structure. In one example, the secondary domain identification information may be one or more domain component value(s) which can be used to query the domain data structure to see if any of the DC values individually or in combination are present in any domain values in the domain data structure. If there is a match, the application will automatically select, as the login domain, the domain value that contains matching elements of secondary domain information and then proceed to step S164.

Figure 2:
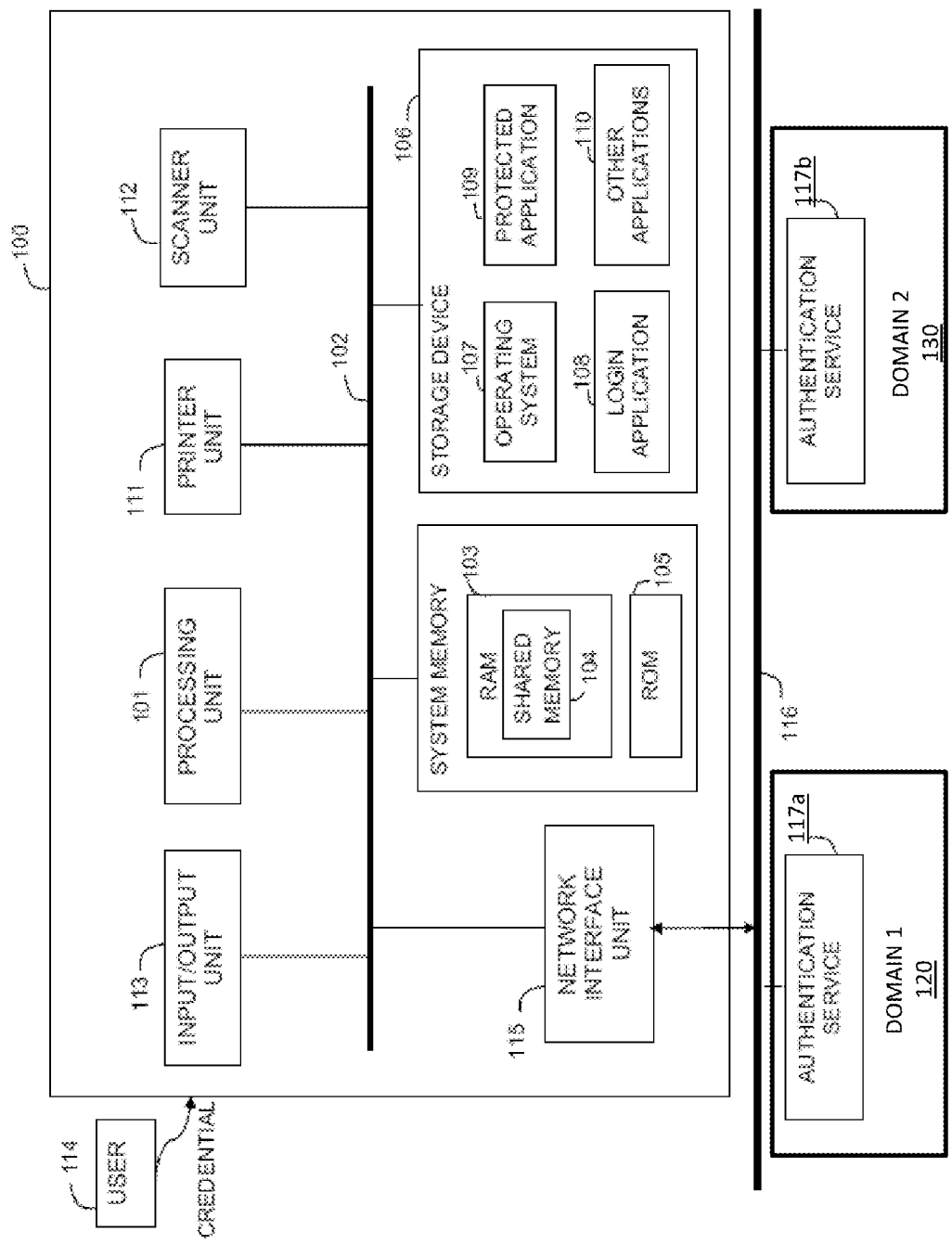
FIG. 2 illustrates an image processing apparatus according to invention principles.

FIG. 2 illustrates an example of an image processing apparatus 100 that includes a processing unit 101, system bus 102, system memory including random access memory (RAM) 103 and read only memory (ROM) 105, a storage device 106 storing various programs and data, a printer unit 111, a scanner unit 112, an input/output (I/O) unit 113, and a network interface unit 115 operable to connect the image processing apparatus 100 to a network 116. The image processing apparatus 100 is connected, via the network 116, to each of a first domain 120 including a first authentication service 117a and a second domain 130 including a second authentication service 117b. As shown herein, an exemplary address for the first domain 120 is "domain1.company.com" and the address for the second domain 130 is "domain2.company.com". These address names are merely exemplary and any type of domain name may be used.

The image processing apparatus 100 is an example of a computing system. The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

The processing unit 101 may comprise a single central-processing unit (CPU) or a plurality of processing units. The processing unit 101 executes various processes and controls the image processing apparatus 100 in accordance with various programs stored in memory. The processing unit 101 controls reading data and control signals into or out of memory. The processing unit 101 uses the RAM 103 as a work area and executes programs stored in the ROM 105 and the storage device 106. In some embodiments, the processor(s) 101 include one or more processors in addition to the CPU. By way of example, the processor(s) 101 may include one or more general-purpose microprocessor(s), application-specific microprocessor(s), and/or special purpose microprocessor(s). Additionally, in some embodiments the processor(s) 101 may include one or more internal caches for data or instructions.

The processor(s) 101 provide the processing capability required to execute an operating system, application programs, and various other functions provided on the image processing apparatus 100. The processor(s) 101 perform or cause components of the image processing apparatus 100 to perform various operations and processes described herein, in accordance with instructions stored in one or more memory devices 103 and 105.

The system bus 102 interconnects various components of the image processing apparatus 100 thereby enabling the transmission of data and execution of various processes. The system bus 102 may be a local bus, for example, and may implement any of a variety of bus architectures.

The RAM 103 is used as a work area during execution of various processes, including when various programs stored in the ROM 105 and/or the storage device 106 are executed. The RAM 103 is used as a temporary storage area for various data. In some embodiments, the RAM 103 is used as a cache memory.

The RAM 103 includes a shared memory 104 from which applications running on the image processing apparatus 100 obtain information as needed. For example, a credential used to log in to the image processing apparatus 100 may be stored in the shared memory 104. Subsequently, an application may obtain the credential from the shared memory 104 and use the credential to log in the user to the application. Further by way of example, domain information associated with a user's login session may be stored in the shared memory 104.

The ROM 105 stores data and programs having computer-executable instructions for execution by the processing unit 101. The ROM 105 stores programs configured to cause the image processing apparatus 100 to execute various operations and processes.

The storage device 106 stores application data, program modules and other information. Some programs and/or program modules stored in the storage device 106 are configured to cause various operations and processes described herein to be executed. The storage device 106 stores an operating system 107, a login application 108, a protected application 109. The storage device 106 may be, for example, a hard disk or other computer-readable storage medium.

Additionally, the computing system may include other storage media, such as non-volatile flash memory, removable memory, such as a compact disk (CD), digital versatile disk (DVD), a CD-ROM, memory card, magneto-optical disk or any combination thereof. All or a portion of a computer-readable storage medium of the computing system may be in the form of one or more removable blocks, modules, or chips. The computer-readable storage medium need not be one physical memory device, but can include one or more separate memory devices.

The operating system 107 includes programs and data for managing hardware and software components of the image processing apparatus 100. Applications on the image processing apparatus 100 utilize the operating system 107 in executing various operations.

The login application 108 includes programs and data for controlling access to resources of the image processing apparatus 100. According to various embodiments, the login application 108 is configured to authenticate users, control access to resources based on authorization, and/or track users' usage of the image processing apparatus 100. The login application 108 may also include the automatic domain identification, selection and configuration discussed above in FIGS. 1A and 1B, the description of which is incorporated herein by reference.

In some embodiments, the login application 108 uses outside computing systems to perform tasks. For example, the image processing apparatus 100 may be in a network domain that requires authentication with one of the first authentication service 117a of the first domain 120 or the second authentication service 117b of the second domain 130 to authenticate users trying to access resources in the network domain. The following description of authentication will presume that the correct login domain has been identified, selected and configured as discussed above and thus will reference the selected and configured domain and authentication service generally using reference number 117. In such a case, the login application 108 may send an authentication request to the authentication service 117 for authenticating the user. The image processing apparatus 100 may be configured for multiple network domains. Accordingly, the login application 108 may utilize multiple authentication services to authenticate users in the respective network domains.

In some embodiments, the login application 108 is configured to execute authentication operations locally. For example, the login application 108 may compare a user credential to a locally stored access control list and then grant or deny the access request based on the comparison.

The login application 108 provides single sign-on capability. For example, when a user 114 logs in to the image processing apparatus 100 upon being authenticated, the login application 108 sends notification of the log-in event to all applications and/or systems configured to receive the notifications. A listing of applications and/or systems configured to receive the log-in event notifications may be stored at the login application 108 and/or the authentication service 117. In some embodiments, applications and/or systems who receive the log-in event notifications initiate operations to log in the user 114 to their respective applications and/or systems. For example, as described above, an application may obtain a credential from the shared memory 104 and use the credential to log in the user 114 to the application. Accordingly, single sign-on is effectuated since the user 114 is logged in both to the image processing apparatus 100 and the respective applications who received the log-in event notifications, even though the user 114 only provided the credential once in order to log in to the image processing apparatus 100.

While the login application 108 generally protects usage of the entire image processing apparatus 100 by controlling access to its resources, some applications on the image processing apparatus 100 may be independently protected by authentication mechanisms. The protected application 109 is one such application.

The protected application 109 includes programs and data configured to execute task-specific functionality and to control access to resources of the protected application 109. Before granting the user 114 access to its resources, the protected application 109 authenticates the user 114 regardless of whether other applications also authenticate the user 114.

For example, the protected application 109 may be configured to perform all operations associated with the login application 108 in terms of identification, selection and authentication with a particular domain's authentication service.

Once logged in to the protected application 109, the user 114 gains access to one or more resources of the protected application 109, including the task-specific functionality of the protected application 109. The task-specific functionality of the protected application 109 enables the user 114 to perform one or more tasks using the protected application 109. For example, the protected application 109 may provide various functions, features and user interfaces for processing image data, transmitting data over a network, managing one or more databases, or other tasks. In some embodiments, the protected application 109 is configured to use one or more resources of the image processing apparatus 100 to perform an operation in response to an instruction from the user. For example, the protected application 109 may use functionality of and/or information on the image processing apparatus 100 to carry out an operation.

In some embodiments, the protected application 109 is stored at least in part on one or more computing systems that are remote to the image processing apparatus 100. For example, the protected application 109 may be an application on a remote server. In some embodiments, the protected application 109 and the image processing apparatus 100 are in the same network domain. In some embodiments, the protected application 109 and the image processing apparatus 100 share an authentication authority. In some embodiments, the protected application 109 utilizes the authentication service 117 to authenticate users.

The image processing apparatus 100 includes a scanner unit 112 includes a light source and an image sensor. The scanner unit 2115 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 112 includes an optical system (for example, mirrors, lens) that directs the light to the image sensor. After the image sensor generates the electrical signals, an analog-to-digital converter converts the electrical signals to digital image data representing the scanned physical document. The scanner unit 112 then outputs the digital image data to one or more other components of the image processing apparatus 100.

The printer unit 111 is an image output device for printing on a sheet an image corresponding to image data. In response to a print command received at the image processing apparatus 100, the printer unit 111 receives image data and outputs to a sheet an image corresponding to the image data. In some embodiments, functionality of the printer unit 111 and/or the scanner unit 112 is implemented when various applications stored in the storage device 106 are executed.

The I/O unit 113 allows for communication between the user 114 and the image processing apparatus 100. For example, the I/O unit 113 may include a monitor or display for output operations such as presenting information to the user 114. The I/O unit 113 is also configured to receive user inputs into the image processing apparatus 100. In some embodiments, the I/O unit 113 includes integrated features such as a touch screen or a panel with buttons to receive user inputs. In some embodiments, the I/O unit 113 includes a variety of interfaces for connecting input devices, such as a keyboard, pointing device, or the like. The I/O unit 113 may also include other features or interfaces for receiving inputs such as a smart card reader, radio-frequency identification (RFID) reader, near field communication (NFC) interface, device for detecting biometric information, wireless receiver, or the like.

The user 114 may utilize the I/O unit 113 in a variety of ways. For example, the user 114 may input via the I/O unit 113 commands such as a command to print, scan, and/or send image data. Further by way of example, the user 114 may provide a credential via the I/O unit 113 in order to log in to the image processing apparatus 100. In some embodiments, the user 114 may provide a username and password for authentication by pressing buttons on a panel of the image processing apparatus 100, or by touching objects displayed on a touch screen of the image processing apparatus 100. In some embodiments, the user 114 may, for authentication, present a smart card storing a certificate and associated key to a smart card reader of the image processing apparatus 100, as well as input a PIN associated with the smart card by pressing buttons on the panel or by touching objects displayed on the touch screen.

The network interface unit 115 is operable to connect the image processing apparatus 100 to one or more networks. As illustrated in FIG. 2, the network interface unit 115 connects the image processing apparatus 100 to the network 116. The network 116 facilitates communications between the image processing apparatus 100 and the first domain 120 and second domain 130 (and any other domains not shown herein). The network 116 is any type of computer network consistent with the teachings of the present invention. For example, the network 116 may comprise a local area network (LAN), wide area network (WAN), or a combination of networks.

The authentication service 117 is one or more computing systems configured to authenticate the user of a client computing system or application. In one embodiment, the authentication service 117 is executing on a server in communication with the image processing apparatus 100 via network 116. For example, before a user of the image processing apparatus 100 (or an application thereof) is granted access to a protected resource, the user may be required to provide a credential, such as a username and password. In certain embodiments the credential used to authenticate the user is obtained directly from a smart card read by a smart card reader coupled to the image processing apparatus. The image processing apparatus 100 or application (108/109) and the authentication service 117 of the identified, selected and configured domain, communicate and execute various processes according to an authentication protocol such as Kerberos, Windows NT LAN Manager (NTLM), Lightweight Directory Access Protocol (LDAP) or other authentication protocol, in order to determine whether the credential is valid. Once the credential is validated, the user is granted access to the resource. In some embodiments, in addition to verifying the user's identity, the authentication service 117 further determines whether the user has permission or authorization to access one or more of the resources sought.

The authentication service 117 may provide authentication services for multiple computing systems and/or applications. Also, the authentication service 117 may be associated with a particular network domain, performing authentication services for computing systems and/or applications within that network domain. According to some embodiments, the authentication service 117 provides authentication services for the protected application 109 on the image processing apparatus 100. The authentication service 117 may also provide authentication services for one or more other applications on the image processing apparatus 100.

Figure 3A:
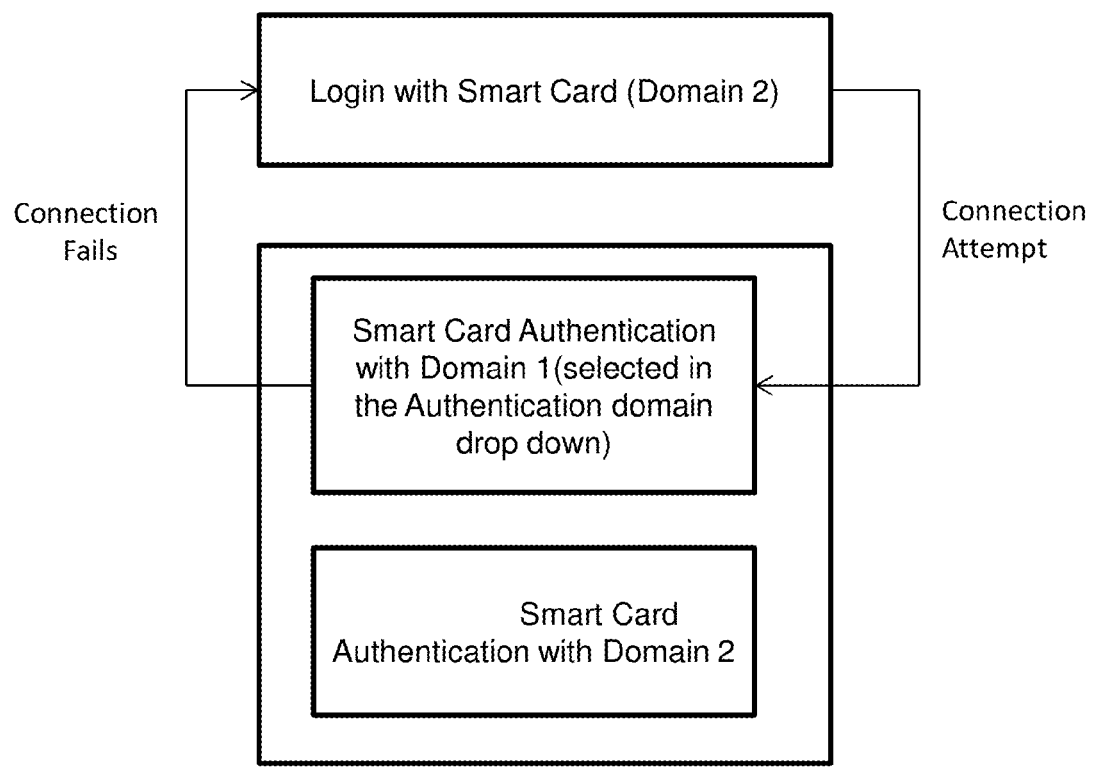
FIGS. 3A-3B illustrate a flow of operations according to invention principles.

FIG. 3A illustrates operation of the image processing apparatus when a user with an identification card configured for to connect to Domain 2 (130 in FIG. 1A) attempts to make that connection with the image processing apparatus 100 configured to connect to Domain 1 (120 in FIG. 1A). As shown herein the application executing on the image processing apparatus has two operational modes. A first, active mode, configured to communicate with Domain 1 and a second, inactive mode, configured to communicate with Domain 2. As shown herein, when the application attempts to connect to the actively configured domain, Domain 1, the connection fails.

Figure 3B:
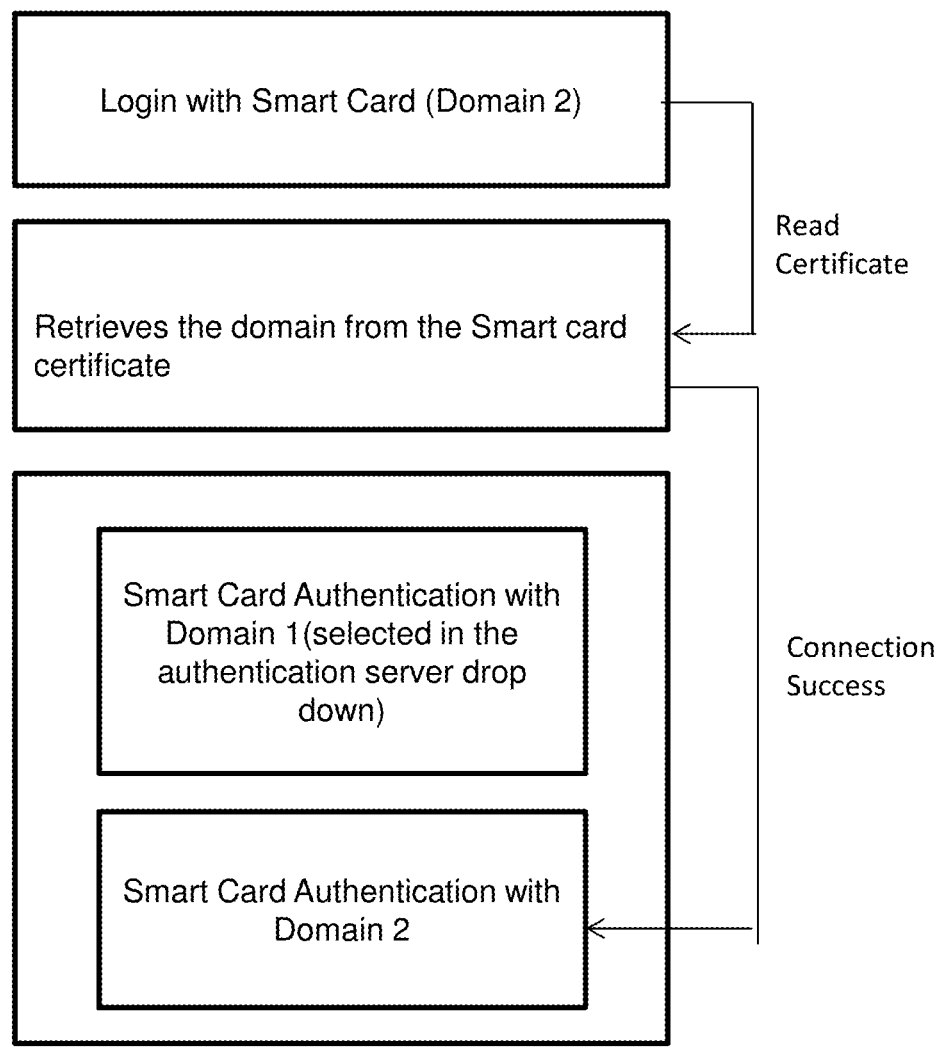

FIG. 3B illustrates the advantages provided by the present invention. Herein, a user with an identification card configured to communicate with Domain 2 has information from the identification card read by the application which retrieves domain identification information from the identification card in accordance with the processes described herein above with respect to FIGS. 1A and 1B and FIG. 2. The application advantageously obtains the domain information and automatically selects the correct operational mode for communicating with the correct login domain. Here, the application determined that the login domain indicated on the identification card is Domain 2 and thus automatically configures the image processing apparatus to connect to Domain 2 to perform login and authentication processing.

Figure 4:
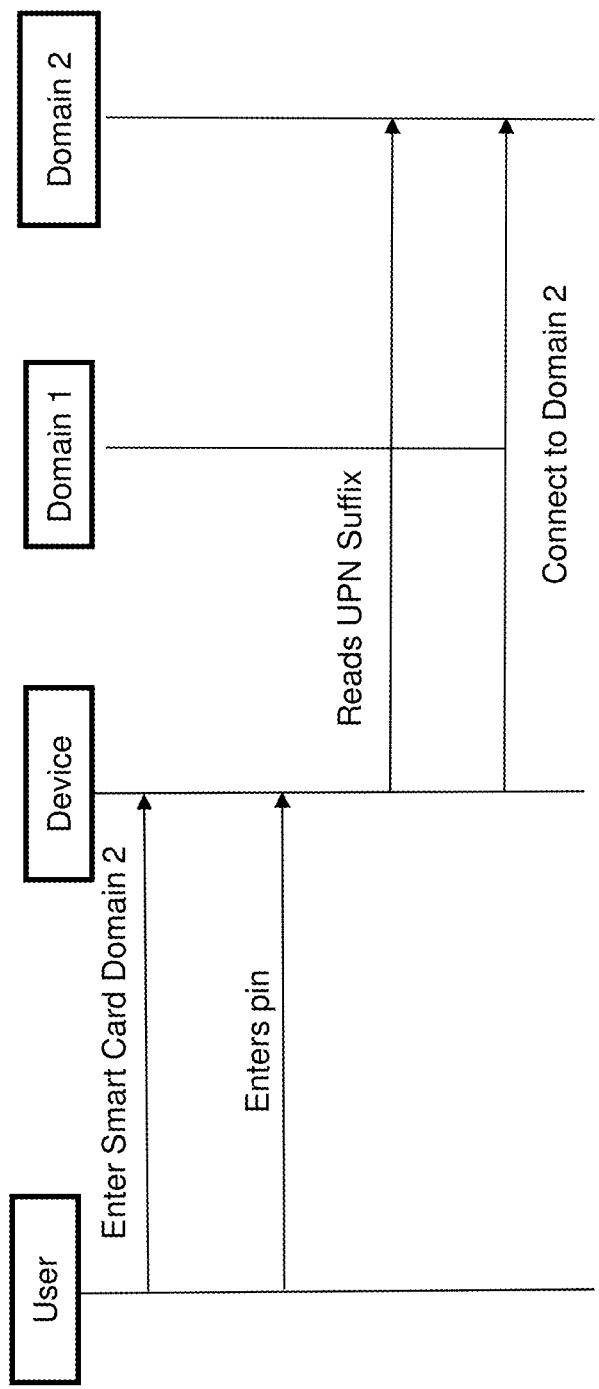
FIG. 4 depicts a sequence diagram illustrating operations according to invention principles.

FIG. 4 illustrates a sequence of instructions discussed above with respect to FIGS. 3A and 3B (as well as other 1A and 1B). As shown herein, the user inserts a smart card configured to login into Domain 2. The user then enters a PIN to verify that the user is actually the associated user of the smart card inserted into the card reader. Once verified, the application reads domain identification information which is shown here as the UPN suffix and derives the domain information therefrom. The application determines that the UPN suffix corresponds to Domain 2 and then initiates login processing with Domain 2.

Figure 5:
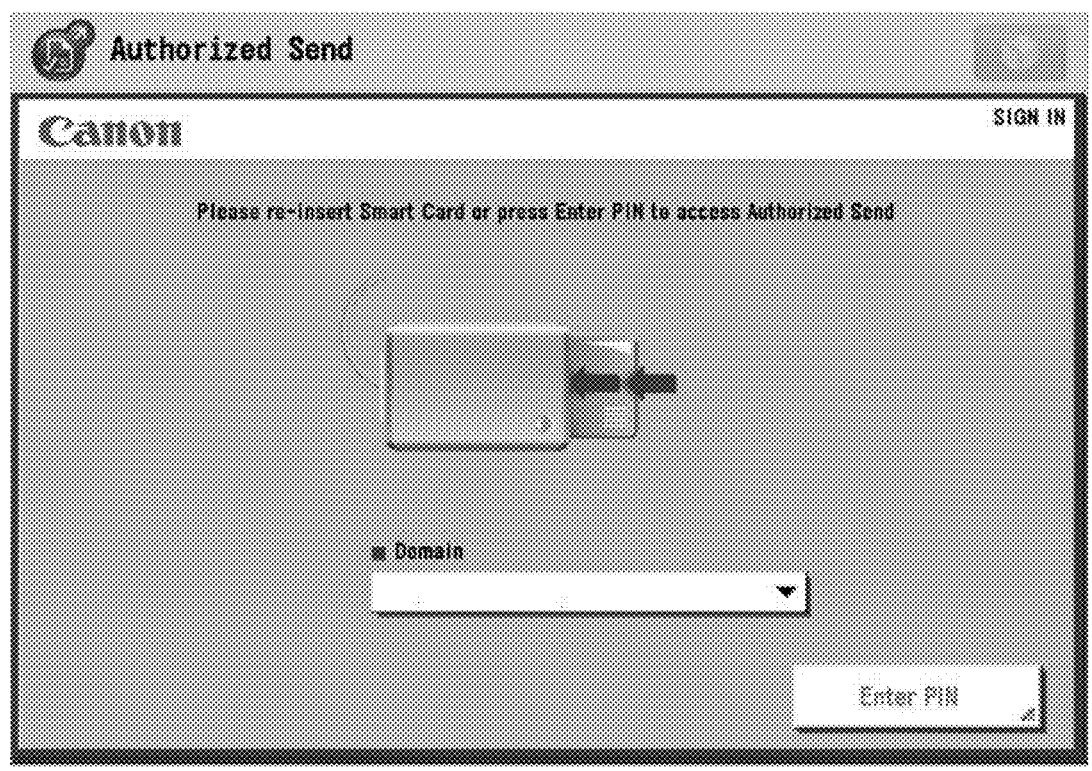
FIG. 5-7 depict screen shots according to invention principles.
Figure 6:
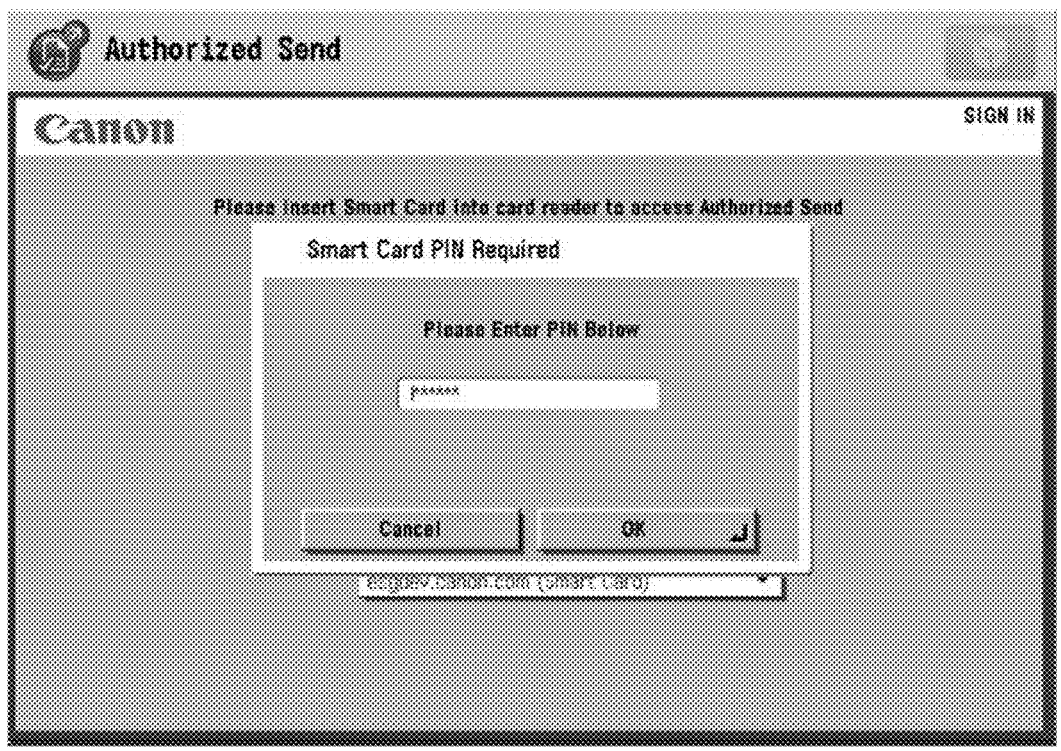
Figure 7:
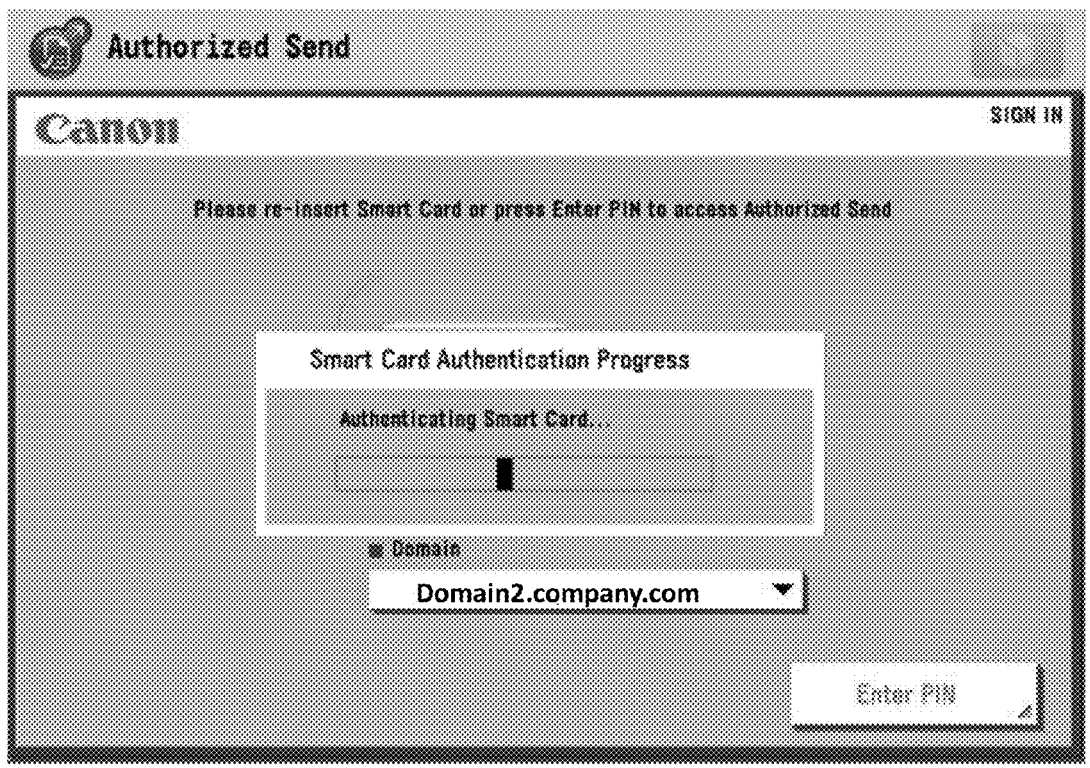
Figure 8:
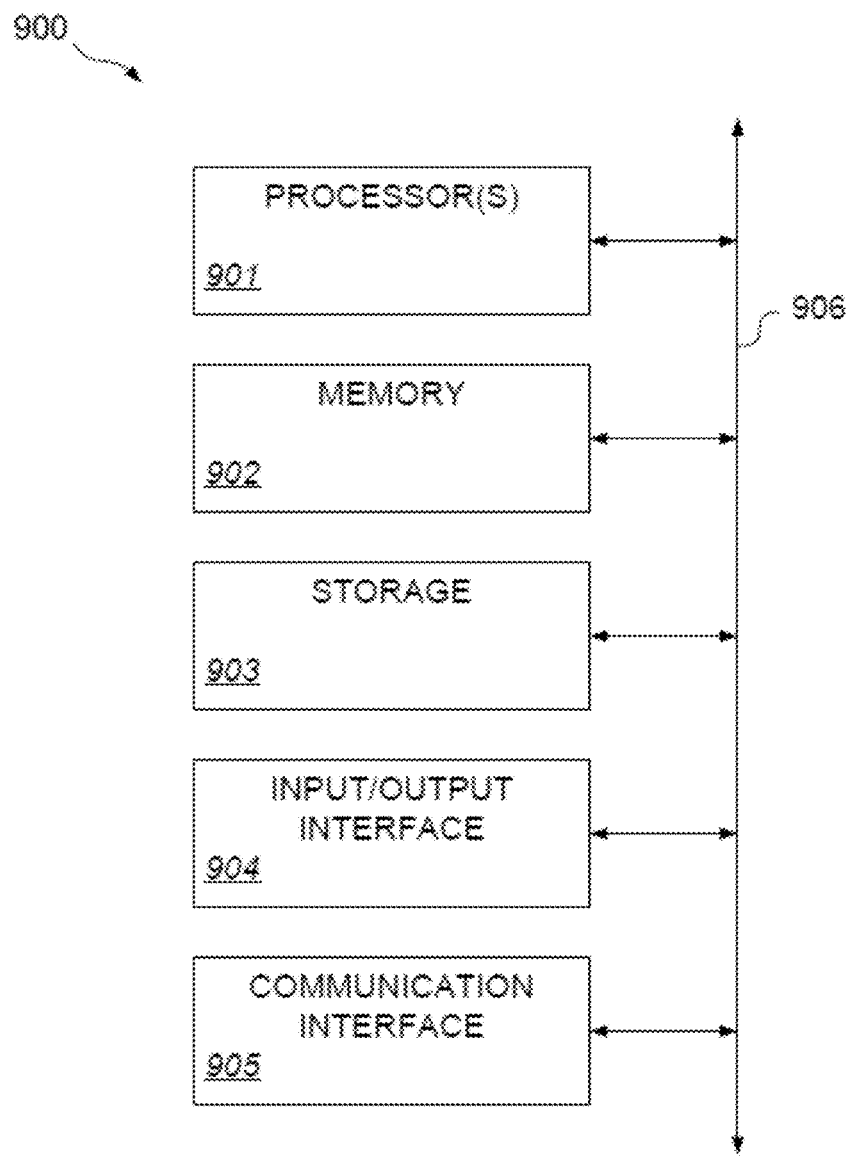
FIG. 8 illustrates a computing system according to invention principles.

FIGS. 5-7 illustrate various screen shots of user interfaces presented on an operation panel of the image processing apparatus during various states discussed herein above. FIG. 5 illustrates an initial home screen that requests that a user insert a smart card. This home screen includes a domain section which, in certain embodiments, may allow for a user to specify the domain with which the smart card being inserted is associated. However, issues may occur when a user is unsure of the specific domain name or configuration and cannot properly identify a domain either independently or selected from a candidate list of domain names. The application according to invention principles enables automatic identification and selection using only the smart card without any other user input which improves the speed with which a user can access one or more resources of functions of the image processing apparatus (or application executing thereon). Further, it improves security by not providing users with domain information which can be used to mount an attack against a domain. It also improves device operation because any number of failed login attempts may negatively impact device usability. Thus, in FIG. 5, the domain section is blank.

FIG. 6 depicts a screen shot that directs a user to input their personal identification information to validate that they are the authorized user of the smart card inserted into the reader. FIG. 7 depicts a screen displayed on the image processing apparatus that occurs after the PIN has been validated. Once validated, the application executing on the image processing apparatus has access to the credential information and can perform the processing discussed herein above with respect to FIGS. 1A-4, to automatically identify and configure a domain to connect to and authenticate with. The screen of FIG. 7 shows that the domain section has now been automatically filled in by determining that the smart card is configured to connect to Domain 2 and authentication processing has already begun and is underway. Thus, the application increases the speed and efficiency that the image processing apparatus may make available to its users one or more resources or functions.

FIG. 9 illustrates the hardware components of computing system and/or server of the first or second domains discussed above with which the image processing apparatus 100 may communicate and referenced herein generally as system 900. According to various embodiments, all or a portion of the description of the system 900 is applicable to all or a portion of one or more of the server 50 or any other computing system. Additionally, the descriptions of the hardware components contained herein apply to similarly named hardware components in any of the image processing apparatus 900.

The term server (or computing system) as used herein includes but is not limited to one or more software modules, one or more hardware modules, one or more firmware modules, or combinations thereof, that work together to perform operations on electronic data. The physical layout of the modules may vary. A server may include multiple computing devices coupled via a network. A server may include a single computing device where internal modules (such as a memory and processor) work together to perform operations on electronic data. Also, the term resource as used herein includes but is not limited to an object that can be processed at a server. A resource can be a portion of executable instructions or data.

In some embodiments, the system 900 performs one or more steps of one or more methods described or illustrated herein. In some embodiments, the system 900 provides functionality described or illustrated herein. In some embodiments, software running on the system 900 performs one or more steps of one or more methods described or illustrated herein or provides functionality described or illustrated herein. Some embodiments include one or more portions of the system 900.

The system 900 includes one or more processor(s) 901, memory 902, storage 903, an input/output (I/O) interface 904, a communication interface 905, and a bus 906. The system 900 may take any suitable physical form. For example, and not by way of limitation, the system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 901 include hardware for executing instructions, such as those making up a computer program. The processor(s) 901 may retrieve the instructions from the memory 902, the storage 903, an internal register, or an internal cache. The processor(s) 901 then decode and execute the instructions. Then, the processor(s) 901 write one or more results to the memory 902, the storage 903, the internal register, or the internal cache. The processor(s) 901 may provide the processing capability to execute the operating system, programs, user and application interfaces, and any other functions of the system 900.

The processor(s) 901 may include a central processing unit (CPU), one or more general-purpose microprocessor(s), application-specific microprocessor(s), and/or special purpose microprocessor(s), or some combination of such processing components. The processor(s) 901 may include one or more graphics processors, video processors, audio processors and/or related chip sets.

In some embodiments, the memory 902 includes main memory for storing instructions for the processor(s) 901 to execute or data for the processor(s) 901 to operate on. By way of example, the system 900 may load instructions from the storage 903 or another source to the memory 902. During or after execution of the instructions, the processor(s) 901 may write one or more results (which may be intermediate or final results) to the memory 902. One or more memory buses (which may each include an address bus and a data bus) may couple the processor(s) 901 to the memory 902. One or more memory management units (MMUs) may reside between the processor(s) 901 and the memory 902 and facilitate accesses to the memory 902 requested by the processor(s) 901. The memory 902 may include one or more memories. The memory 902 may be random access memory (RAM).

The storage 903 stores data and/or instructions. As an example and not by way of limitation, the storage 903 may include a hard disk drive, a floppy disk drive, flash memory, an optical disc, a magneto-optical disc, magnetic tape, or a Universal Serial Bus (USB) drive or a combination of two or more of these. In some embodiments, the storage 903 is a removable medium. In some embodiments, the storage 903 is a fixed medium. In some embodiments, the storage 903 is internal to the system 900. In some embodiments, the storage 903 is external to the system 900. In some embodiments, the storage 903 is non-volatile, solid-state memory. In some embodiments, the storage 903 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 903 may include one or more memory devices. One or more program modules stored in the storage 903 may be configured to cause various operations and processes described herein to be executed.

The I/O interface 904 includes hardware, software, or both providing one or more interfaces for communication between the system 900 and one or more I/O devices. The system 900 may include one or more of these I/O devices, where appropriate. One or more of these I/O devices may enable communication between a person and the system 900. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 904 includes one or more device or software drivers enabling the processor(s) 901 to drive one or more of these I/O devices. The I/O interface 904 may include one or more I/O interfaces.

The communication interface 905 includes hardware, software, or both providing one or more interfaces for communication (such as, for example, packet-based communication) between the system 900 and one or more other servers or one or more networks. As an example and not by way of limitation, the communication interface 905 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 905 for it. As an example and not by way of limitation, the system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the system 900 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. Additionally the communication interface may provide the functionality associated with short distance communication protocols such as NFC and thus may include an NFC identifier tag and/or an NFC reader able to read an NFC identifier tag positioned with a predetermined distance of the computing device. The system 900 may include any suitable communication interface 905 for any of these networks, where appropriate. The communication interface 905 may include one or more communication interfaces 905.

The bus 906 interconnects various components of the system 900 thereby enabling the transmission of data and execution of various processes. The bus 906 may include one or more types of bus structures including a memory bus or memory controller, a peripheral bus, and a local bus using any of a variety of bus architectures.

The above description serves to explain principles of the invention; but the invention should not be limited to the examples described above. For example, the order and/or timing of some of the various operations may vary from the examples given above without departing from the scope of the invention. Further by way of example, the type of network and/or servers may vary from the examples given above without departing from the scope of the invention. Other variations from the above-recited examples may also exist without departing from the scope of the invention.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

We claim:

1. An image processing apparatus comprising:
   one or more processors; and
   a memory storing instructions that, when executed by the one or more processors configures the image processing apparatus to
   receive, from a credential source, a credential having a domain identifier identifying an authentication domain and authentication data used to authenticate with an authentication domain;
   parse at least a portion of the domain identifier to obtain information identifying the authentication domain with which to authenticate the credential;

automatically reconfigure the image processing apparatus to authenticate with the identified authentication domain when it is determined, based on the information identifying the authentication domain, that a currently configured authentication domain is different from the identified authentication domain; and transmit the authentication data of the received credential to the reconfigured domain for domain authentication processing.

2. The image processing apparatus according to claim 1, wherein upon execution of the instructions, the image processing apparatus is further configured to receive, from a user, a local authentication credential used to locally authenticate the credential source with the image processing apparatus prior to receiving the credential.

3. The image processing apparatus according to claim 1, wherein the memory stores a data object including a set of at least two domain configurations representing available domains with which the image processing apparatus can execute domain authentication processing, and execution of the instructions further configures the image processing apparatus to search the stored data object in the memory for available authentication domains, and determine, using the information identifying the authentication domain received from the credential source, whether the image processing apparatus is capable of authenticating the credential with the identified authentication domain.

4. The image processing apparatus according to claim 1, wherein the automatic reconfiguration of the authentication domain occurs without the need to disconnect the credential source from the image processing apparatus.

5. The image processing apparatus according to claim 1, wherein in response to determining that image processing apparatus is not configured to execute authentication processing with identified authentication domain, modifying a data object including a set of available authentication domains to include the identified authentication domain; and automatically reconfigure the image processing apparatus using the modified data object to enable authentication processing with the identified domain.

6. The image processing apparatus according to claim 1, wherein the credential source is a smart card and includes a storage for storing information identifying the authentication domain and the authentication data, and the image processing apparatus further comprises a card reader that selectively receives the smart card and reads the information identifying the authentication domain.

7. The image processing apparatus according to claim 1, wherein the information identifying the authentication domain is a user principal name.

8. The image processing apparatus according to claim 1, wherein the memory stores a data object including a set of at least two domain configurations representing available domains with which the image processing apparatus can execute domain authentication processing, each respective domain configuration including a target domain address with which the credential source can be authenticated and at least one alias domain address that is different from but associated with the target domain address, and execution of the instructions further configures the image processing apparatus to search the stored data object in the memory for available authentication domains;

determine, by comparing the information identifying the authentication domain received from the credential source, with respective target domain addresses and at least one alias domain addresses, whether the image processing apparatus is capable of authenticating the credential with the identified authentication domain;

in response to determining that the information identifying the authentication domain matches an alias domain information, selecting the target domain address associated with the identified alias domain information; and transmitting the authentication data to the selected target domain for authentication processing.

9. The image processing apparatus according to claim 1, wherein the information identifying the authentication domain includes a primary domain identifier indicating the domain with which the credential can be authenticated, and at least one secondary type of domain identifier that is used to identify the authentication domain in a case where the primary domain identifier is not available.

10. The image processing apparatus according to claim 9, wherein the primary domain identifier is a user principal name, and the at least one secondary type of domain identifier includes one or more of (a) a domain component data, and (b) subject name data contained in a certificate stored on the credential source.

11. A method of controlling login processing in an image processing apparatus, the method comprising:

receiving, from a credential source, a credential having a domain identifier identifying an authentication domain and authentication data used to authenticate with an authentication domain;

parsing at least a portion of the domain identifier to obtain information identifying the authentication domain with which to authenticate the credential;

automatically reconfiguring the image processing apparatus to authenticate with the identified authentication domain when it is determined, based on the information identifying the authentication domain, that a currently configured authentication domain is different from the identified authentication domain; and transmitting the authentication data of the received credential to the reconfigured domain for domain authentication processing.

12. The method according to claim 11, further comprising receiving, from the credential source, a local authentication credential used to locally authenticate the credential source with the image processing apparatus prior to receiving the credential.

13. The method according to claim 11, further comprising searching a data object including a set of at least two domain configurations representing available domains with which the image processing apparatus can execute domain authentication processing the stored in memory for available authentication domains, and determining, using the information identifying the authentication domain received from the credential source, whether the image processing apparatus is capable of authenticating the credential with the identified authentication domain.

14. The method according to claim 11, wherein
the automatic reconfiguration of the authentication domain occurs without the need to disconnect the credential source from the image processing apparatus.

15. The method according to claim 11, further comprising
modifying a data object including a set of available authentication domains to include the identified authentication domain in response to determining that image processing apparatus is not configured to execute authentication processing with identified authentication domain; and
automatically reconfiguring the image processing apparatus using the modified data object to enable authentication processing with the identified domain.

16. The method according to claim 11, wherein
the credential source is a smart card and includes a storage for storing information identifying the authentication domain and the authentication data, and the image processing apparatus, and the activity of receiving is performed by a card reader that selectively receives the smart card and reads the information identifying the authentication domain.

17. The method according to claim 11, wherein
the information identifying the authentication domain is a user principal name.

18. The method according to claim 11, wherein the memory stores, and execution of the instructions further configures the image processing apparatus to
searching a data object stored in memory that includes a set of at least two domain configurations representing available domains with which the image processing apparatus can execute domain authentication processing, each respective domain configuration including a target domain address with which the credential source can be authenticated and at least one alias domain address different from but associated with the target domain address for available authentication domains;
determining, by comparing the information identifying the authentication domain received from the credential source, with respective target domain addresses and at least one alias domain addresses, whether the image processing apparatus is capable of authenticating the credential with the identified authentication domain;
in response to determining that the information identifying the authentication domain matches an alias domain information, selecting the target domain address associated with the identified alias domain information; and
transmitting the authentication data to the selected target domain for authentication processing.

19. The method according to claim 11, wherein
the information identifying the authentication domain includes a primary domain identifier indicating the domain with which the credential can be authenticated, and at least one secondary type of domain identifier that is used to identify the authentication domain in a case where the primary domain identifier is not available, wherein
the primary domain identifier is a user principal name, and
the at least one secondary type of domain identifier includes one or more of (a) a domain component data, and (b) subject name data contained in a certificate stored on the credential source.

20. A non-transitory computer readable storage medium storing instructions that, when executed by one or more processors, configures an image processing apparatus to execute a method of controlling login processing in an image processing apparatus, the method comprising:
receiving, from a credential source, a credential having a domain identifier identifying an authentication domain and authentication data used to authenticate with authentication domain;
parsing at least a portion of the domain identifier to obtain information identifying the authentication domain with which to authenticate the credential;
automatically reconfiguring the image processing apparatus to authenticate with the identified authentication domain when it is determined, based on the information identifying the authentication domain, that a currently configured authentication domain is different from the identified authentication domain; and
transmitting the authentication data of the received credential to the reconfigured domain for domain authentication processing.

* * * * *